United States Patent [19]

Dunfield et al.

[11] Patent Number: 5,619,389

[45] Date of Patent: Apr. 8, 1997

[54] STATOR ISOLATION FOR SPINDLE MOTOR

[75] Inventors: John C. Dunfield, Santa Cruz; Gunter K. Heine, Aptos, both of Calif.

[73] Assignee: Seagate Technology, Inc., Scotts Valley, Calif.

[21] Appl. No.: 386,883

[22] Filed: Feb. 10, 1995

[51] Int. Cl.$^6$ .............................. G11B 17/02; H02K 5/24; H02K 1/12

[52] U.S. Cl. .................. 360/98.07; 360/99.08; 310/51; 310/254

[58] Field of Search ..................... 360/97.01, 98.01, 360/98.07, 98.08, 99.04, 99.08–99.12, 254, 258; 310/51, 67 R

[56] References Cited

U.S. PATENT DOCUMENTS

| | | | |
|---|---|---|---|
| 1,688,891 | 10/1928 | Spreen | 310/51 |
| 3,483,407 | 12/1969 | Frohmuller et al. | 310/51 |
| 3,546,504 | 12/1970 | Janssen et al. | 310/51 |
| 4,268,233 | 5/1981 | Fernstrom | 418/270 |
| 4,647,803 | 3/1987 | von der Heide et al. | 310/51 |
| 4,672,250 | 6/1987 | Seitz | 310/90 |
| 4,760,299 | 7/1988 | Dickie et al. | 310/91 |
| 4,823,034 | 4/1989 | Wrobel | 310/67 |
| 4,935,080 | 6/1990 | Hassell et al. | 156/154 |
| 4,965,476 | 10/1990 | Lin | 310/51 |
| 5,079,466 | 1/1992 | Jones | 310/91 |
| 5,097,366 | 3/1992 | Ueki et al. | 360/97.02 |
| 5,200,866 | 4/1993 | Fruge et al. | 360/99.08 |
| 5,227,686 | 7/1993 | Ogawa | 310/90 |
| 5,235,227 | 8/1993 | Fazekas | 310/51 |
| 5,241,229 | 8/1993 | Katakura et al. | 310/51 |
| 5,352,947 | 10/1994 | MacLeod | 360/99.08 |
| 5,367,418 | 11/1994 | Chessman et al. | 360/99.12 |
| 5,376,850 | 12/1994 | Elsing et al. | 310/67 |
| 5,430,589 | 7/1995 | Moir et al. | 360/97.02 |
| 5,457,588 | 10/1995 | Hattori et al. | 360/99.08 |
| 5,461,271 | 10/1995 | Asama et al. | 310/91 |

FOREIGN PATENT DOCUMENTS

| | | | |
|---|---|---|---|
| 770273 | 10/1967 | Canada | 310/70 |
| 3-89838A | 4/1991 | Japan . | |
| 4-168942A | 6/1992 | Japan . | |
| 4-251542A | 9/1992 | Japan . | |
| 4-364340A | 12/1992 | Japan . | |
| 2154072 | 8/1985 | United Kingdom . | |

*Primary Examiner*—Jefferson Evans
*Attorney, Agent, or Firm*—Westman, Champlin & Kelly, P.A.

[57] ABSTRACT

A spindle motor for rotating at least one disc in a data storage device includes a base, a shaft, a rotor and a stator. A bearing interconnects the rotor with the shaft and allows the rotor to rotate about the shaft. A resilient coupling, such as an O-ring, is compressed between the stator and the base to mechanically isolate the stator from the base and thereby reduce the generation of acoustic noise in the storage device.

20 Claims, 4 Drawing Sheets

STATOR ISOLATION FOR SPINDLE MOTOR

BACKGROUND OF THE INVENTION

The present invention relates generally to the field of spindle motors for disc drive data storage devices and, more particularly, to a spindle motor in which the stator is isolated from the base of the storage device.

Disc drive data storage devices, known as "Winchester" type disc drives, are well-known in the industry. In a Winchester disc drive, digital data are written to and read from a thin layer of magnetizable material on the surface of rotating discs. Write and read operations are performed through a transducer which is carried in a slider body. The slider and transducer are sometimes collectively referred to as a head, and typically a single head is associated with each disc surface. The heads are selectively moved under the control of electronic circuitry to any one of a plurality of circular, concentric data tracks on the disc surface by an actuator device. Each slider body includes a self-acting hydrodynamic air bearing surface. As the disc rotates, the disc drags air beneath the air bearing surface, which develops a lifting force that causes the slider to lift and fly several microinches above the disc surface.

In the current generation of disc drive products, the most commonly used type of actuator is a rotary moving coil actuator. The discs themselves are typically mounted in a "stack" on the hub structure of a brushless DC spindle motor. The rotational speed of the spindle motor is precisely controlled by motor drive circuitry which controls both the timing and the power of commutation signals directed to the stator windings of the motor.

The first Winchester disc drives to be produced were large cabinet models which included discs having a diameter of 14 inches and AC induction spindle motors. These types of disc drives were commonly located in dedicated "computer rooms" with large mainframe computers, where environmental factors such as temperature and humidity could be carefully controlled. In this type of environment, the acoustic noise generated by cooling fans and disc drive motors was of little concern, since the only persons directly in contact with the systems were maintenance personnel, who were generally not in the computer rooms for extended periods of time. The users of such systems were typically located at a remote location and communicated with the computer system via keyboards and display terminals which did not generate excessive amounts of acoustic noise.

More recently, personal computers have become more popular and are commonly located within the work space of the system user. This has prompted an increase in awareness of acoustic noise generated by the disc drives located within the personal computers. In certain markets, such as Europe, the amount of acoustic noise allowable in the work place is closely regulated. With this in mind, it has become common for system manufacturers to impose a "noise budget" on manufacturers of major system components, such as disc drives, which limits the amount of acoustic noise that such components can contribute to the overall noise of the system.

One of the principal sources of noise in disc drive data storage devices is the spindle motor which drives the discs at a constant speed. Typical spindle motor speeds have been in the range of 3600 RPM. Current technology has increased spindle motor speeds to 4800 RPM, 7200 RPM and above. Analysis of various types of disc drives has brought to light several different modes of acoustic noise generation which are attributable to the spindle motor and its control logic.

One mode of noise generation is sympathetic vibration of the disc drive housing in response to the rotating mass of the spindle motor. Another mode of acoustic noise generation is electromagnetic disturbances caused by the excitation of the stator mass by the application and removal of the commutation pulses that are used to drive the motor and control its speed. The commutation pulses are timed, polarization-selected DC current pulses which are directed to sequentially selected stator windings. The rapid rise and fall times of these pulses act as a striking force and set up sympathetic vibrations in the stator structure.

If the stator structure is rigidly connected to the disc drive housing, either directly or through a rigid material, these vibrations are coupled to the housing and generate resonant vibrations in the housing causing unacceptable levels of acoustic noise.

Prior art attempts to reduce or eliminate noise include controlling the resonant frequency of the housing, and damping the vibration of the housing. In U.S. Pat. No. 5,376,850, acoustic noise is reduced by uncoupling the stator from hard contact with the stationary portion of the shaft. A plurality of O-rings interposed radially between the stator and the shaft of the spindle motor. Also, a non-metallic washer is positioned at one end of the shaft and an axial O-ring is positioned at the other end of the shaft.

SUMMARY OF THE INVENTION

The present invention is a spindle motor for a disc drive data storage device in which the stator is isolated from the base to reduce acoustic noise in the storage device. The spindle motor includes a stationary member attached to the base. A rotor is interconnected to the stationary member through a bearing. A resilient coupling, such as an O-ring, is positioned between the stator and the base to isolate the stator from the base.

In one embodiment, the resilient coupling includes an O-ring extending around an outer diameter of the stator. The O-ring is located radially between the stator and the base and is compressed between the stator and the base. The coupling can also include a resilient damping bridge which extends between and is compressed against upper surfaces of the stator and the base in an axial direction. The combination of the O-ring and the damping bridge provides the stator with improved torsional stiffness and vertical stiffness with respect to the base.

In an alternative embodiment, the spindle motor includes two O-rings extending around the outer diameter of the stator and spaced from one another. The use of two O-rings also provides improved torsional stiffness and vertical stiffness. The spindle motor can further include a resilient, isolating material positioned between a bottom surface of the stator and the base to provide additional stability and isolation.

The O-rings can have any suitable cross section and can be formed of an integral ring or one or more individual pieces of O-ring type material. The O-rings can be integrated in the stator either by a vulcanizing process or by overmolding the O-rings onto the stator. While the present invention is useful in motors having ball bearings, present invention is particularly useful in hydrodynamic bearing motors to reduce or eliminate pure vibration tones which become more noticeable with lower levels of background vibration.

DETAILED DESCRIPTION OF THE PREFERRED EMBODIMENTS

Figure 1:
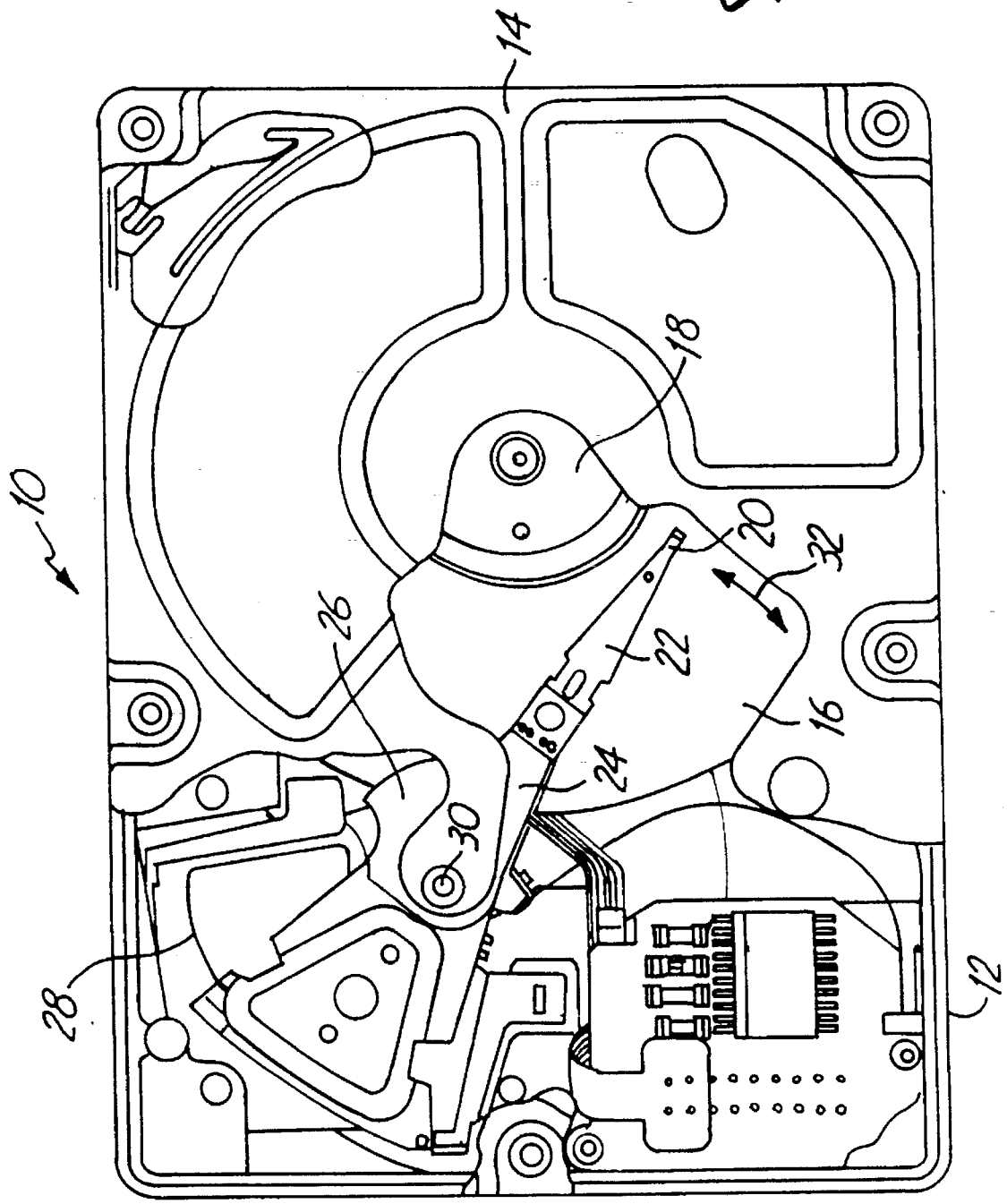
FIG. 1 is a top plan view of a disc drive data storage device, in accordance with the present invention.

The present invention is a spindle motor for a disc drive data storage device in which the stator is isolated from the base to reduce acoustic levels in the storage device. FIG. 1 is a plan view of a typical disc drive 10 in which the present invention is useful. Disc drive 10 includes a housing base 12 and a top cover 14. The housing base 12 is combined with top cover 14 to form a sealed environment to protect the internal components from contamination by elements from outside the sealed environment.

The base and top cover arrangement shown in FIG. 1 is common in the industry. However, other arrangements of the housing components have been frequently used, and the present invention is not limited to the configuration of the disc drive housing. For example, disc drives have been manufactured using a vertical split between two housing members. In such drives, that portion of the housing half which connects to the lower end of the spindle motor is analogous to base 12, while the opposite side of the same housing member, which is connected to or adjacent the top of the spindle motor, is functionally the same as the top cover 14.

Disc drive 10 further includes a disc pack 16 which is mounted for rotation on a spindle motor (not shown) by a disc clamp 18. Disc pack 16 includes a plurality of individual discs which are mounted for co-rotation about a central axis. Each disc surface has an associated head 20 which is mounted to disc drive 10 for communicating with the disc surface. In the example shown in FIG. 1, heads 20 are supported by flexures 22 which are in turn attached to head mounting arms 24 of an actuator body 26. The actuator shown in FIG. 1 is of the type known as a rotary moving coil actuator and includes a voice coil motor (VCM), shown generally at 28. Voice coil motor 28 rotates actuator body 26 with its attached heads 20 about a pivot shaft 30 to position heads 20 over a desired data track along an arcuate path 32. While a rotary actuator is shown in FIG. 1, the present invention is also useful in disc drives having other types of actuators, such as linear actuators.

Figure 2:
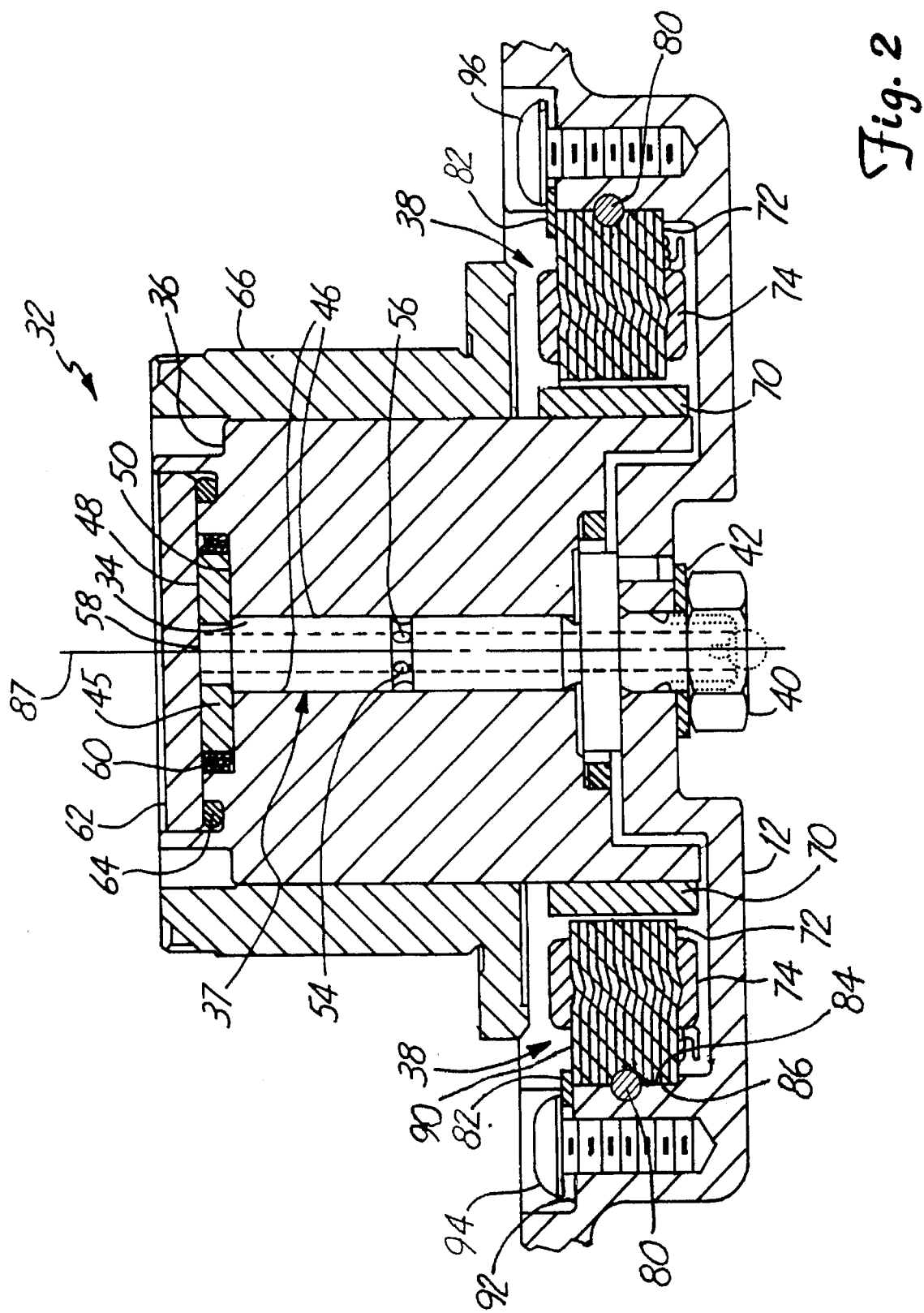
FIG. 2 is a sectional view of an isolated hydrodynamic bearing spindle motor in accordance with the present invention.

FIG. 2 is a sectional view of a hydrodynamic bearing spindle motor 32 in accordance with the present invention. Spindle motor 32 includes a stationary member 34, a hub or sleeve 36 and a stator 38. In the embodiment shown in FIG. 2, the stationary member is a shaft which is fixed and attached to base 12 through a nut 40 and a washer 42. Hub 36 is interconnected with shaft 34 through a hydrodynamic bearing 37 for rotation about shaft 34. Bearing 37 includes a radial working surface 46 and axial working surfaces 48 and 50. Shaft 34 includes fluid ports 54, 56 and 58 which supply hydrodynamic fluid 60 and assist in circulating the fluid along the working surfaces of the bearing. Hydrodynamic fluid 60 is supplied to shaft 34 by a fluid source (not shown) which is coupled to the interior of shaft 34 in a known manner.

Spindle motor 32 further includes a thrust bearing 45 which forms the axial working surfaces 48 and 50 of hydrodynamic bearing 37. A counterplate 62 bears against working surface 48 to provide axial stability for the hydrodynamic bearing and to position hub 36 within spindle motor 32. An O-ring 64 is provided between counterplate 62 and hub 36 to seal the hydrodynamic bearing. The seal prevents hydrodynamic fluid 60 from escaping between counterplate 62 and hub 36.

Hub 36 includes a disc carrier member 66 which supports disc pack 16 (shown in FIG. 1) for rotation about shaft 34. Disc pack 16 is held on disc carrier member 66 by disc clamp 18 (also shown in FIG. 1). A permanent magnet 70 is attached to the outer diameter of hub 36, which acts as a rotor for spindle motor 32.

Stator 38 is formed of a stack of stator laminations 72 and associated stator windings 74. In accordance with the present invention, stator 38 is mechanically isolated from base 12 through a resilient coupling. It has been found through experiments that hydrodynamic bearing motors are much quieter and in general have lower background vibration levels than motors having ball bearings. Because the background vibration levels are less in a hydrodynamic bearing motor, vibration responses to electromagnetic disturbances become more noticeable since the responses are no longer hidden in the background. Therefore, it is desirable to reduce or eliminate as far as possible the transfer of vibrations resulting from electromagnetic disturbances from the stator to the base.

As shown in FIG. 2, stator 38 is resiliently coupled to, but mechanically isolated from, base 12. Stator 38 is coupled to base 12 through an O-ring 80 and a resilient damping bridge 82. O-ring 80 is compressed between a side surface 84 of stator 38 and a side surface 86 of base 12 such that stator 38 and base 12 are adjacent to, but spaced from, one another in a radial direction with respect to a central axis 87. In one embodiment, O-ring 80 is integrated in stator 38 to form an assembly which facilitates a low-cost approach to mounting the stator within base 12. For example, O-ring 80 can be integrated in an indentation (not shown) in stator 38 through a vulcanizing process. O-ring 80 can also be integrated in stator 38 by over-molding the O-ring onto the stator. The O-ring material flows over the stator to form the desired O-ring features and is then hardened at a selected temperature and pressure. The vulcanizing process and the over-molding process are controlled to provide the desired damping and stiffness characteristics.

Base 12 includes a corresponding annular groove (not labeled) which retains O-ring 80 under compression when stator 38 is mounted within base 12. The annular groove within base 12 also assists in axially constraining O-ring 80. O-ring 80 can be formed of a rubber or plastic material. In a preferred embodiment, O-ring 80 is formed of a 70 durometer material such as Viton®, a patented polymer product of E. I. DuPont de Nemours Co., of Wilmington, Del., and is subjected to 0.009 inches of radial compression. Other materials which provide suitable isolation and stiffness may also be used to isolate stator 38 from base 12. O-ring 80 can be formed as a continuous internal ring or as one or more individual pieces of O-ring material positioned between stator 38 and base 12. O-ring 80 can have any suitable cross section, such as circular or rectangular.

Resilient bridge 82 extends between an upper mounting surface 90 of stator 38 and an upper mounting surface 92 of base 12. Bolts 94 and 96 secure bridge 82 to base 12 and compress bridge 82 against the upper mounting surfaces 90 and 92 in an axial direction to provide additional vertical stiffness for the resilient coupling between stator 38 and base 12. The combination of O-ring 80 and resilient bridge 82 clamps stator 38 rotationally and vertically with respect to base 12. The O-ring preferably has enough torsional stiffness so that as spindle motor 32begins to rotate, stator 38 is not allowed to rotate more than an insignificant amount. The combination of O-ring 80 and resilient bridge 82 provides sufficient vertical and torsional stiffness.

Resilient bridge 82 is preferably formed of a material similar to that of O-ring 80. Resilient bridge 82 can be an annular ring, as shown in FIG. 2, or can include one or more individual bridge pieces which extend between stator 38 and base 12. In addition, bridge 82 can be formed as a washer which is secured to base 12 by a bolt, such as bolt 94 or 96. The washer would have a tab that would extend between base 12 and stator 38. Resilient bridge 82 can also be formed as a clamp of O-ring type material. Further, bridge 82 can be compressed against the upper mounting surfaces 90 and 92 in several ways. For example, resilient bridge 82 can be compressed by bolt 94, as shown in FIG. 2, or can be compressed by a portion of top cover 14 (shown in FIG. 1). The mounting surfaces 90 and 92 can also include associated grooves for accepting resilient bridge 82. In addition, resilient bridge 82 can be integrated into the stator similar to O-ring 80.

In the embodiment shown in FIG. 2, the spindle motor is a "below-hub" type motor in which stator 38 is positioned below hub 36, as opposed to within hub 36. In addition, stator 38 is located externally from hub 36 and is attached directly to base 12. In this embodiment, O-ring 80 and resilient damping bridge 82 are located at an outer diameter of stator 38.

Figure 3:
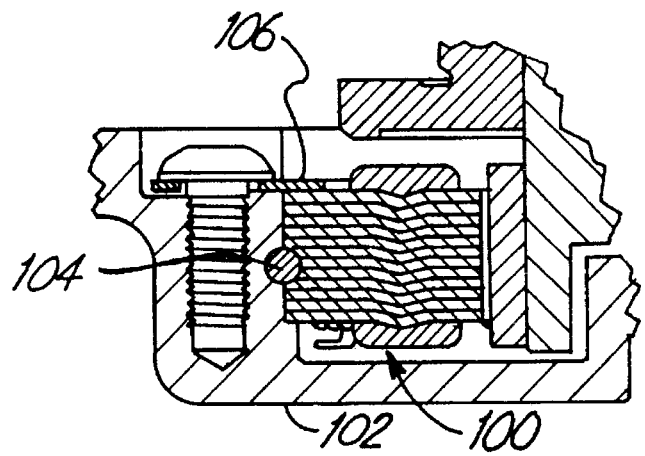
FIG. 3 is a fragmentary sectional view of an alternative attachment between the stator and the base in which the stator is partially isolated from the disc.

FIG. 3 is a fragmentary sectional view of a spindle motor which illustrates an alternative attachment between the stator and the base. In FIG. 3, stator 100 is attached to base 102 through an O-ring 104 and a metallic C-clamp 106. C-clamp 106 provides sufficient vertical stiffness between stator 100 and base 102 but does not provide complete isolation between the stator and the base as does the embodiment shown in FIG. 2. Therefore, the embodiment shown in FIG. 2 is preferred over the embodiment shown in FIG. 3.

Figure 4:
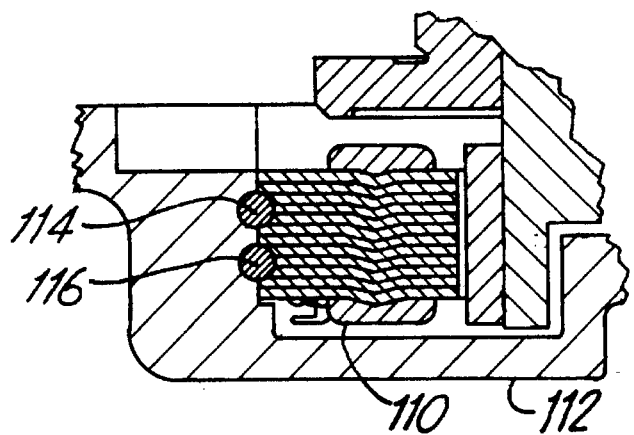
FIG. 4 is a fragmentary sectional view of an alternative attachment between the stator and the base which includes two O-rings for isolation.

FIG. 4 is a fragmentary sectional view of a spindle motor illustrating another alternative attachment between the stator and the base. In FIG. 4, stator 110 is attached to base 112 through two O-rings 114 and 116. O-rings 114 and 116 are located radially between stator 110 and 112. O-rings 114 and 116 are separated from one another by a radius such that they form a couple which contributes to the vertical and torsional stiffness of stator 110 with respect to base 112. If the stator is rotated with respect to the base, the O-rings provide a restoring torque to overcome the rotation. The O-rings also maintain vertical alignment of the stator by providing a restoring force in a vertical direction in response to vertical movement of the stator with respect to the base. In the embodiment shown in FIG. 4, there is no need for a clamp or a bridge between stator 110 and base 112 since O-rings 114 and 116 provide sufficient vertical and torsional stiffness.

Figure 5:
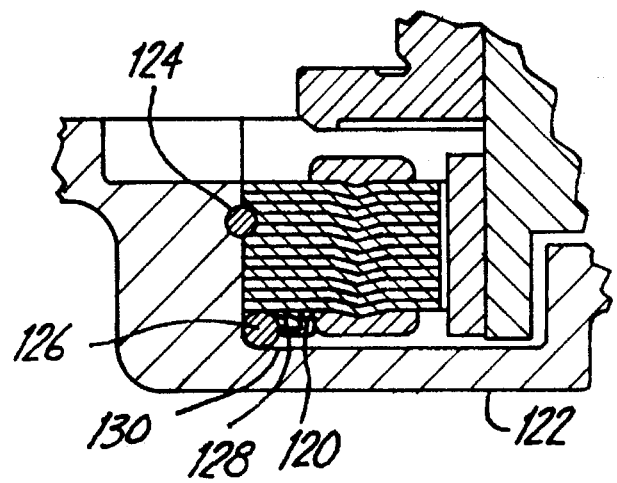
FIG. 5 is a fragmentary sectional view of another alternative attachment between the stator and the base which includes an O-ring located radially between the stator and the base and an O-ring located axially between the stator and the base.

FIG. 5 is a fragmentary sectional view of a spindle motor which illustrates another embodiment of the present invention. In FIG. 5, stator 120 is resiliently coupled to base 122 through O-rings 124 and 126. O-ring 124 is located radially between stator 120 and base 122. O-ring 124is compressed between the side walls of stator 120 and base 122 similar to the O-rings shown in FIGS. 2–4. O-ring 126 is located axially and compressed between a lower mounting surface 128 of stator 120 and an opposing surface 130 of base 122. O-ring 126 provides additional stability and isolation rectangular.

While the present invention is particularly useful in hydrodynamic bearing motors to reduce pure tone vibrations where the background vibration level is relatively low, the present invention is also useful in motors having ball bearings to reduce or eliminate the transfer of vibrations from the stator to the base.

Figure 6:
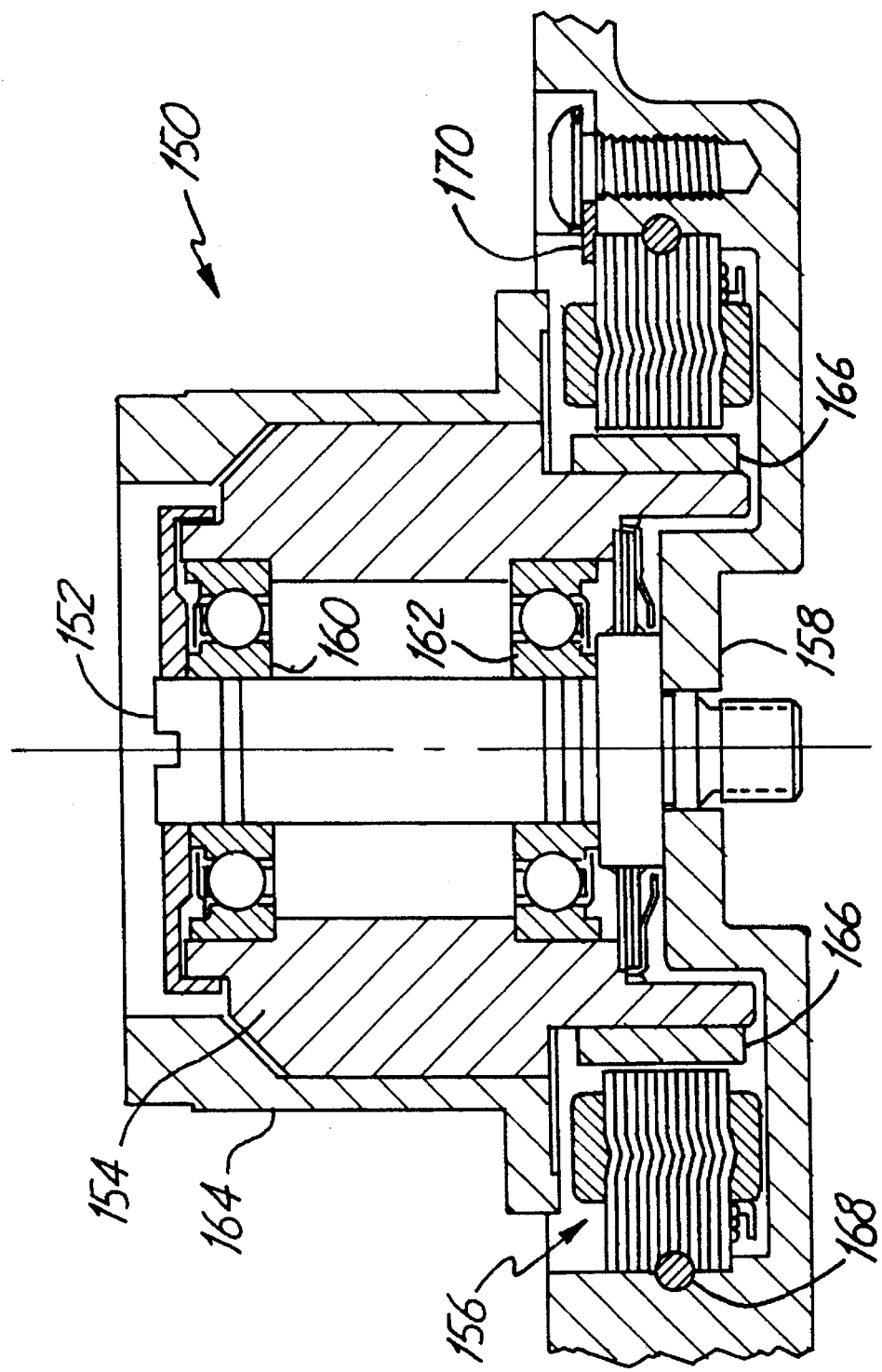
FIG. 6 is a sectional view of a ball bearing spindle motor, in accordance with the present invention.

FIG. 6 illustrates a spindle motor having ball bearings, as opposed to a hydrodynamic bearing. Spindle motor 150 includes a shaft 152, a hub 154 and a stator 156. Shaft 152 is a stationary shaft which is fixedly attached to a base 158. Shaft 152 is also attached to the inner races of ball bearings 160 and 162. Hub 154 is attached to the outer races of bearings 160 and 162 for rotation about shaft 152. Hub 154 includes a disc carrying member 164 which carries a plurality of magnetic discs (not shown) for rotation about shaft 152. Hub 154 also carries a permanent magnet 166 which forms a rotor for spindle motor 150.

As in the embodiments shown in FIGS. 2–5, stator 156 can be attached to base 158 through one or more resilient couplings, such as O-ring 168. Spindle motor 150 can also include a resilient damping ring or tab 170 for providing additional vertical stiffness between stator 156 and base 158. As discussed above, damping ring or tab 170 is optional. Alternatively, spindle motor 150 can be provided with a metallic C-clamp as shown in FIG. 3, two O-rings as shown in FIG. 4, or an additional O-ring located between the bottom of stator 156 and base 158.

FIGS. 1–6 illustrate embodiments in which the stator is positioned external to the hub such that the O-rings are positioned along the outer diameter of the stator. However, the O-rings can also be positioned along the inner diameter of the stator in embodiments in which the stator is attached to the base about the stator's inner diameter.

Although the present invention has been described with reference to preferred embodiments, workers skilled in the art will recognize that changes may be made in form and detail without departing from the spirit and scope of the invention. For example, the resilient coupling between the stator and the base can be implemented in a variety of ways and can include a combination of the embodiments discussed above. The embodiments shown in the figures are provided by way of example only. Also, the resilient coupling can be implemented in a variety of stator and base configurations. The stator isolation of the present invention can be used in fixed shaft or rotating shaft spindle motors. In a rotating shaft spindle motor, the bearing is located between the rotating shaft and an outer stationary sleeve which is coaxial with the rotating shaft.

What is claimed is:

1. A spindle motor for rotating at least one disc about a central axis in a storage device, comprising:

a base having a side wall;

a stationary member attached to the base;

a hub comprising a rotor, wherein the hub is rotatable with respect to the stationary member;

a hydrodynamic bearing interconnecting the hub with the stationary member;

a stator radially positioned external to and coaxial with the rotor, wherein the stator has a side surface which is located at an outer diameter of the stator and is spaced from the base side wall in a radial direction with respect to the central axis; and a resilient, vibration damping coupling compressed between the stator side surface and the base side wall in the radial direction.

2. The spindle motor of claim 1 wherein the resilient coupling includes a first coupling ring which is compressed between the side surface of the stator and the base side wall.

3. The spindle motor of claim 2 wherein the resilient coupling includes a second coupling ring which is compressed between the stator side surface and the base side wall and is spaced from the first coupling ring.

4. The spindle motor of claim 2 wherein:

the stator has an upper mounting surface;

the base has an upper mounting surface which is spaced laterally from the upper mounting surface of the stator; and the resilient coupling further includes a damping bridge extending between and compressed against the upper mounting surfaces of the stator and base.

5. The spindle motor of claim 4 wherein the damping bridge comprises a damping ring of resilient material extending around a circumference of the stator.

6. The spindle motor of claim 4 wherein the damping bridge comprises:

a clamp which is secured to the base and is compressed against the upper mounting surfaces of the stator and the base.

7. The spindle motor of claim 4 wherein:

the stator has a lower mounting surface which is located generally opposite to the upper mounting surface of the stator; and the resilient coupling further includes a second coupling ring compressed between the lower mounting surface of the stator and the base.

8. The spindle motor of claim 2 wherein:

the stator further includes a lower mounting surface which extends in a plane that is approximately normal to the stator side surface; and wherein the resilient coupling further includes a second resilient coupling ring which is compressed between the lower mounting surface of the stator and the base, and wherein the first and second coupling rings cooperate to define a stator position within the base.

9. The spindle motor of claim 1 wherein:

the stator has a mounting surface;

the base has a mounting surface which is spaced laterally from the mounting surface of the stator; and the spindle motor further comprises a metallic C-clamp secured to the base and extending between the mounting surfaces of the stator and the base.

10. The spindle motor of claim 1 wherein the resilient coupling is integrated in the stator.

11. The spindle motor of claim 10 wherein the resilient coupling comprises a resilient polymer material which is over-molded onto the stator and wherein the stator and over-molded polymer material are pressed into the base with the over-molded material being compressed against the base side wall.

12. A spindle motor for rotating at least one disc about a central axis in a storage device, comprising:

a base having a side wall;

a stationary member attached to the base;

a hub comprising a rotor, wherein the hub is rotatable with respect to the stationary member;

a hydrodynamic bearing interconnecting the hub with the stationary member;

a stator positioned within the base, axially below the hub with respect to the central axis and radially external to and coaxial with the rotor, wherein the stator has a side surface which is located at an outer diameter of the stator and is spaced from the base side wall;

a first resilient, vibration damping coupling which couples the stator and the base; and a second resilient, vibration damping coupling which couples the stator and the base, wherein the second resilient coupling is spaced from the first resilient coupling in an axial direction with respect to the central axis.

13. The spindle motor of claim 12 wherein:

the first resilient coupling includes an O-ring which is positioned radially between the stator and the base with respect to the central axis; and the second resilient coupling includes a resilient bridge which is compressed against the stator and the base in an axial direction with respect to the central axis.

14. The spindle motor of claim 12 wherein:

the first resilient coupling includes a first O-ring which positioned radially between the stator and the base with respect to the central axis; and the second resilient coupling includes a second O-ring which positioned radially between the stator and the base with respect to the central axis.

15. A hydrodynamic bearing spindle motor for rotating at least one disc about a central axis in a data storage device, comprising:

a base having a side wall;

a stationary shaft attached to the base;

a rotor;

a hydrodynamic bearing positioned between the shaft and the rotor;

a stator radially positioned external to and coaxial with the rotor, wherein the stator has a side surface which is located at an outer diameter of the stator and is spaced from the base side wall in a radial direction with respect to the central axis; and a first resilient O-ring compressed between the stator side surface and the base side wall in the radial direction.

16. The hydrodynamic bearing spindle motor of claim 15 and further comprising a second resilient O-ring which is compressed between the stator side surface and the base side wall and is spaced from the first resilient O-ring in an axial direction with respect to the central axis.

17. The hydrodynamic bearing spindle motor of claim 15 and further comprising a damping bridge extending from the stator to the base and compressed against the stator and the base in an axial direction with respect to the central axis.

18. The hydrodynamic bearing spindle motor of claim 15 and further comprising a resilient coupling compressed between the stator and the base in an axial direction with respect to the central axis.

19. A disc drive data storage system, comprising:

a housing having a base;

a central axis;

a stationary member attached to the base and coaxial with the central axis;

a rotatable member which is rotatable with respect to the stationary member;

a bearing interconnecting the rotatable member with the stationary member;

at least one data storage disc attached to and coaxial with the rotatable member;

a stator positioned within the base, axially below the rotatable member with respect to the central axis, and radially external to and coaxial with the rotor, wherein the stator has a side surface which is located at an outer diameter of the stator and is spaced from the base side wall in a radial direction with respect to the central axis;

a first resilient, vibration damping coupling which couples the stator and the base; and a second resilient, vibration damping coupling which couples the stator and the base, wherein the second resilient coupling is spaced from the first resilient coupling in an axial direction with respect to the central axis.

20. A spindle motor for rotating at least one disc about a central axis in a storage device, comprising:

a base;

a stationary member attached to the base;

a hub comprising a rotor, wherein the hub is rotatable with respect to the stationary member;

a bearing interconnecting the hub with the stationary member;

a stator which is spaced from the base by a gap and which includes a stack of laminations; and a resilient, vibration damping bridge formed of a polymeric material which extends across the gap from an upper surface of said stack of laminations to the base and is compressed against the stator and the base in an axial direction with respect to the central axis, wherein the resilient, vibration damping bridge forms a coupling between the stator and the base which inhibits transfer of vibrations between the stator and the base.

* * * * *